(12) United States Patent
Chen

(10) Patent No.: US 7,216,971 B1
(45) Date of Patent: May 15, 2007

(54) EYEGLASS WITH LENS FASTENING ARRANGEMENT

(76) Inventor: Jun-Wei Chen, No. 53. Jhuben Village, Lionjiao Township. Chiayi County 615 (TW)

( * ) Notice: Subject to any disclaimer, the term of this patent is extended or adjusted under 35 U.S.C. 154(b) by 0 days.

(21) Appl. No.: 11/424,665

(22) Filed: Jun. 16, 2006

(51) Int. Cl.
*G02C 1/00* (2006.01)

(52) U.S. Cl. .......................................... 351/86; 351/85
(58) Field of Classification Search ................ 351/86, 351/83, 85, 103, 106, 41, 90, 92
See application file for complete search history.

(56) References Cited

U.S. PATENT DOCUMENTS 6,491,388 B1 * 12/2002 Chen ............................ 351/86
6,959,988 B1 * 11/2005 Sheldon ....................... 351/106

* cited by examiner

*Primary Examiner*—Hung Xuan Dang
(74) *Attorney, Agent, or Firm*—Alan Kamrath; Kamrath & Associates PA

(57) ABSTRACT

A pair of eyeglasses with lens fastening arrangement includes a frame having two sets of one or more through holes formed on an outer top and/or bottom edge of each of a pair of openings. The through holes communicate with grooves of the openings. A pair of lenses each includes one or more projections formed on an outer top and/or a bottom edge of each lens. The projection is adapted to lockingly engage with the through hole with peripheral edges of the lenses being inserted into the grooves of the openings of the frame when the lenses are firmly fitted in the openings of the frame. Thereby, loosening of the lenses by bending temples of the eyeglasses is substantially impossible.

4 Claims, 5 Drawing Sheets

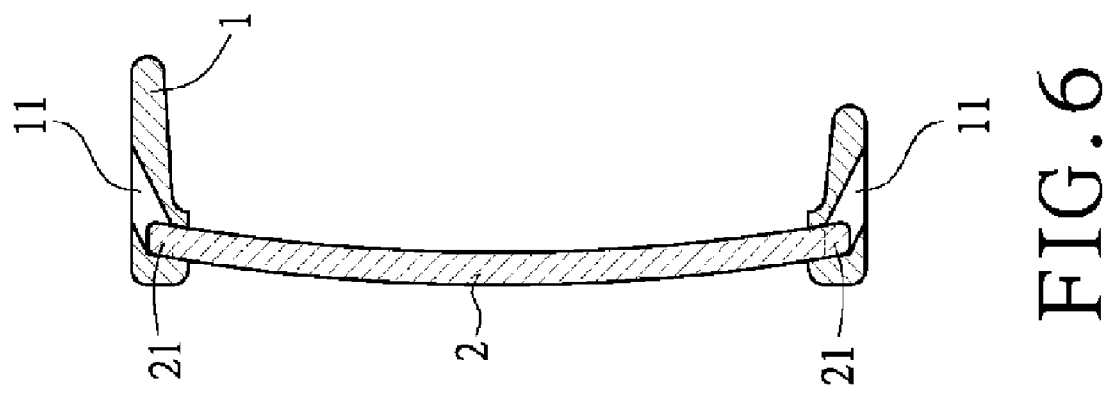
FIG. 6
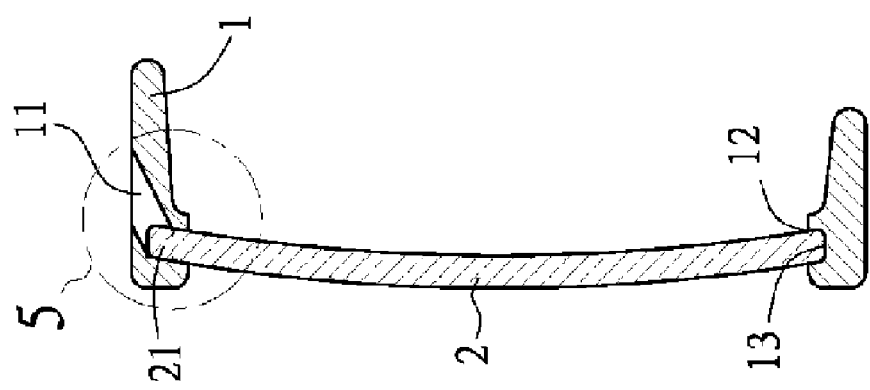
FIG. 5
FIG. 4

EYEGLASS WITH LENS FASTENING ARRANGEMENT

BACKGROUND OF THE INVENTION

1. Field of Invention

The present invention relates to eyeglasses and, more particularly, to a pair of eyeglasses (e.g., sunglasses or safety glasses) having a secure lens fastening arrangement so as to keep lenses being firmly fastened in a frame.

2. Related Art

A pair of conventional eyeglasses 40 such as sunglasses or safety glasses is shown in FIG. 1. The eyeglasses 40 comprise a frame 10 including left and right openings with lenses 30 fitted therein. A peripheral edge 101 of each opening has a peripheral groove 102 there along for receiving the lens 30. Two temples 20 are respectively pivotably connected to either end of the frame 10.

Referring to FIG. 2, it is typical for a quality control worker to test the produced eyeglasses 40 by outwardly bending the temples 20. Unfortunately, the lenses 30 are prone to loosening and disengaging from the frame 10 due to the fastening arrangement, i.e., the eyeglasses 40 will not pass quality control. Thus, continuing improvements in the exploitation of eyeglasses having a lens fastening arrangement are constantly being sought.

SUMMARY OF THE INVENTION

It is, therefore, an object of the present invention to provide a pair of eyeglasses, such as sunglasses or safety glasses, having a lenses fastening arrangement such that loosening of lenses by bending temples is substantially impossible.

To achieve the above and other objects, the present invention provides a pair of eyeglasses includes a frame having two sets of one or more through holes formed on an outer top and/or bottom edge of each of a pair of openings. The through holes communicate with grooves of the openings. A pair of lenses each includes one or more projections formed on an outer top and/or a bottom edge of each lens. The projection is adapted to lockingly engage with the through hole with peripheral edges of the lenses being inserted into the grooves of the openings of the frame when the lenses are firmly fitted in the openings of the frame. Thereby, loosening of the lenses by bending temples of the eyeglasses is substantially impossible.

In one aspect of the present invention, the through hole of the frame extends at an incline so that the projection is invisible when held in the through hole.

The above and other objects, features and advantages of the present invention will become apparent from the following detailed description taken with the accompanying drawings.

BRIEF DESCRIPTION OF THE DRAWINGS

FIG. 4 is a longitudinal sectional view of the frame and the lens in FIG. 3;

FIG. 5 is a front view of the area in circle 5 in FIG. 4;

FIG. 6 is a longitudinal sectional view of a lens and a frame according to a second preferred embodiment of the eyeglasses of the invention.

DETAILED DESCRIPTION OF THE INVENTION

Figure 1:
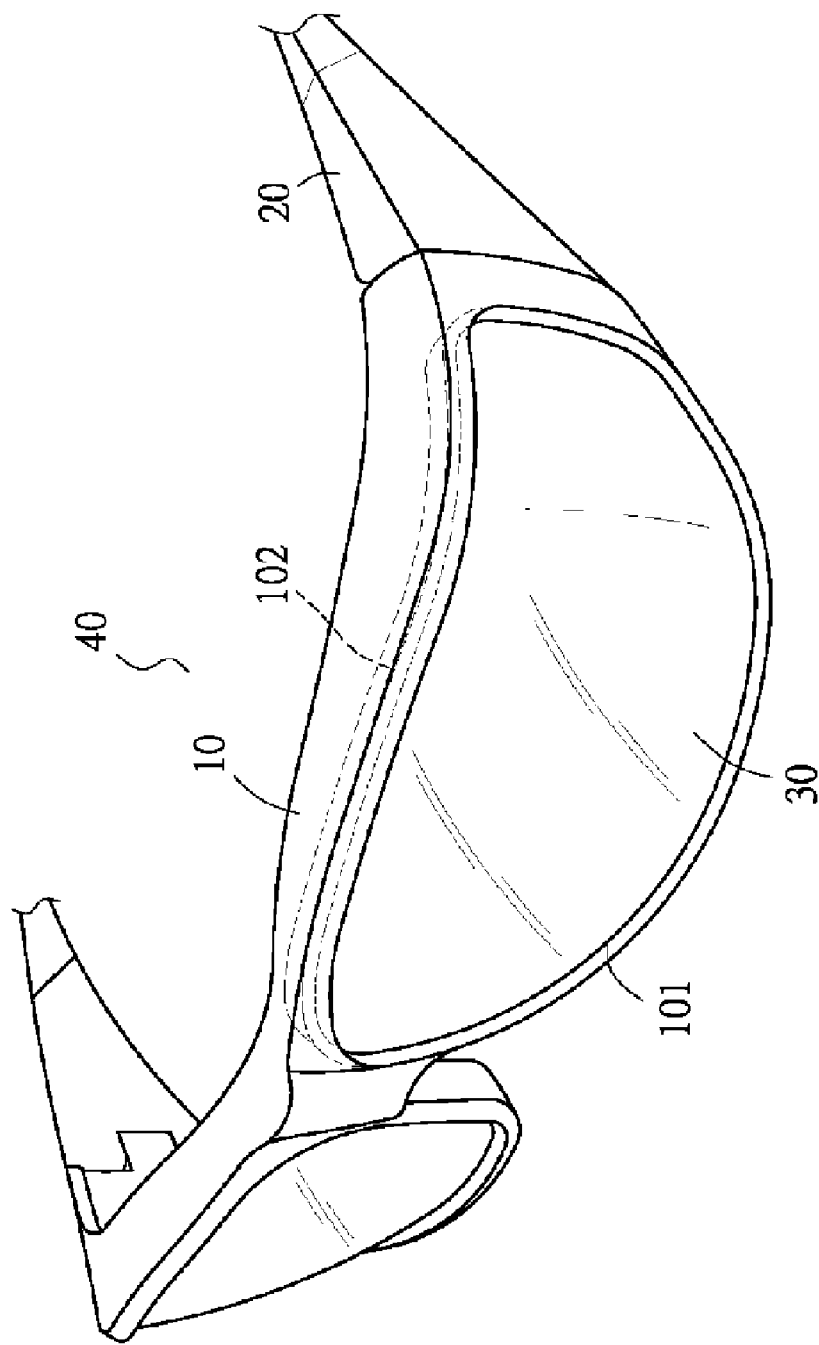
FIG. 1 is a perspective view of conventional eyeglasses such as sunglasses or safety glasses.
Figure 2:
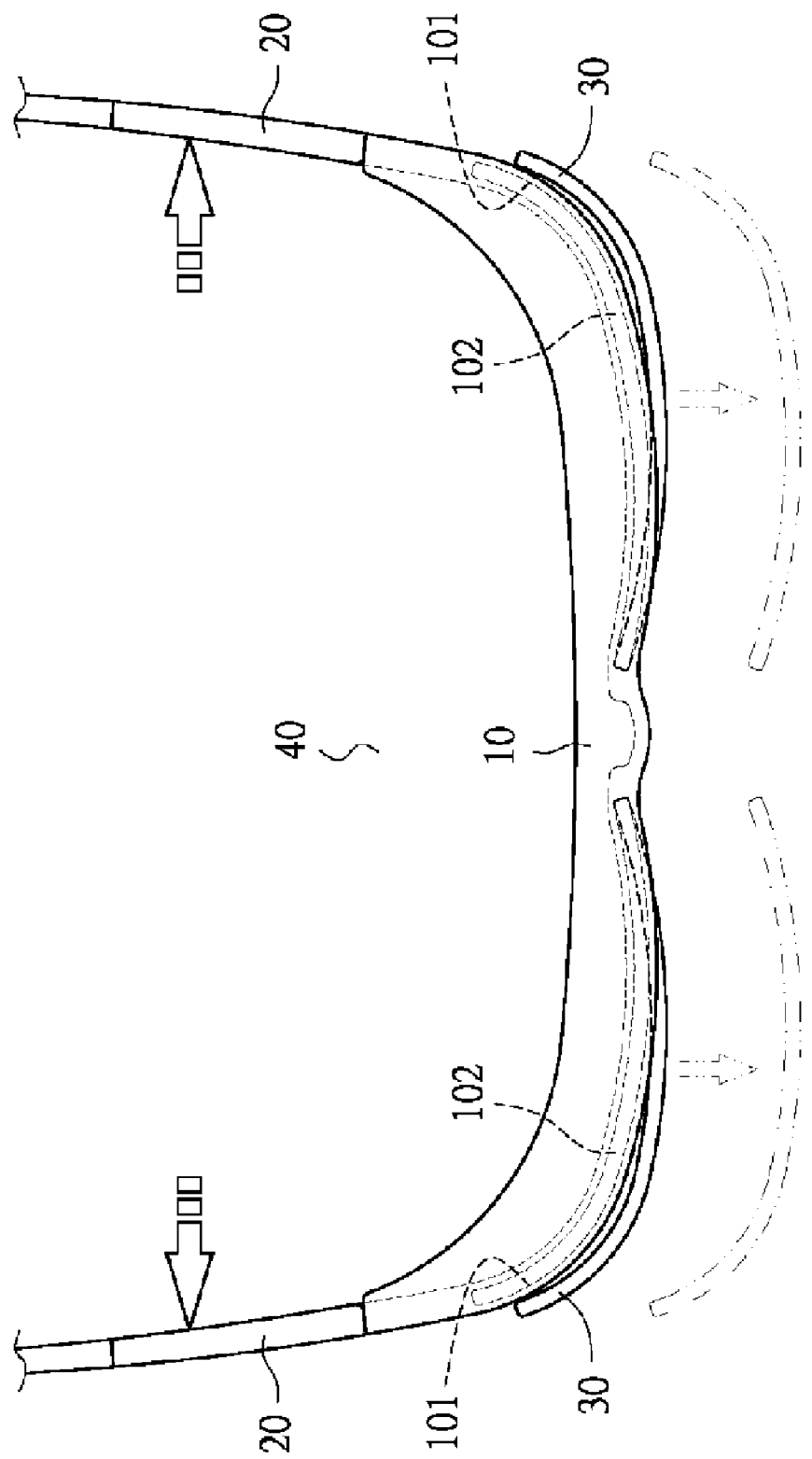
FIG. 2 is a top plan view of the eyeglasses in FIG. 1 showing a loosening of the lenses by outward bending the temples.
Figure 3:
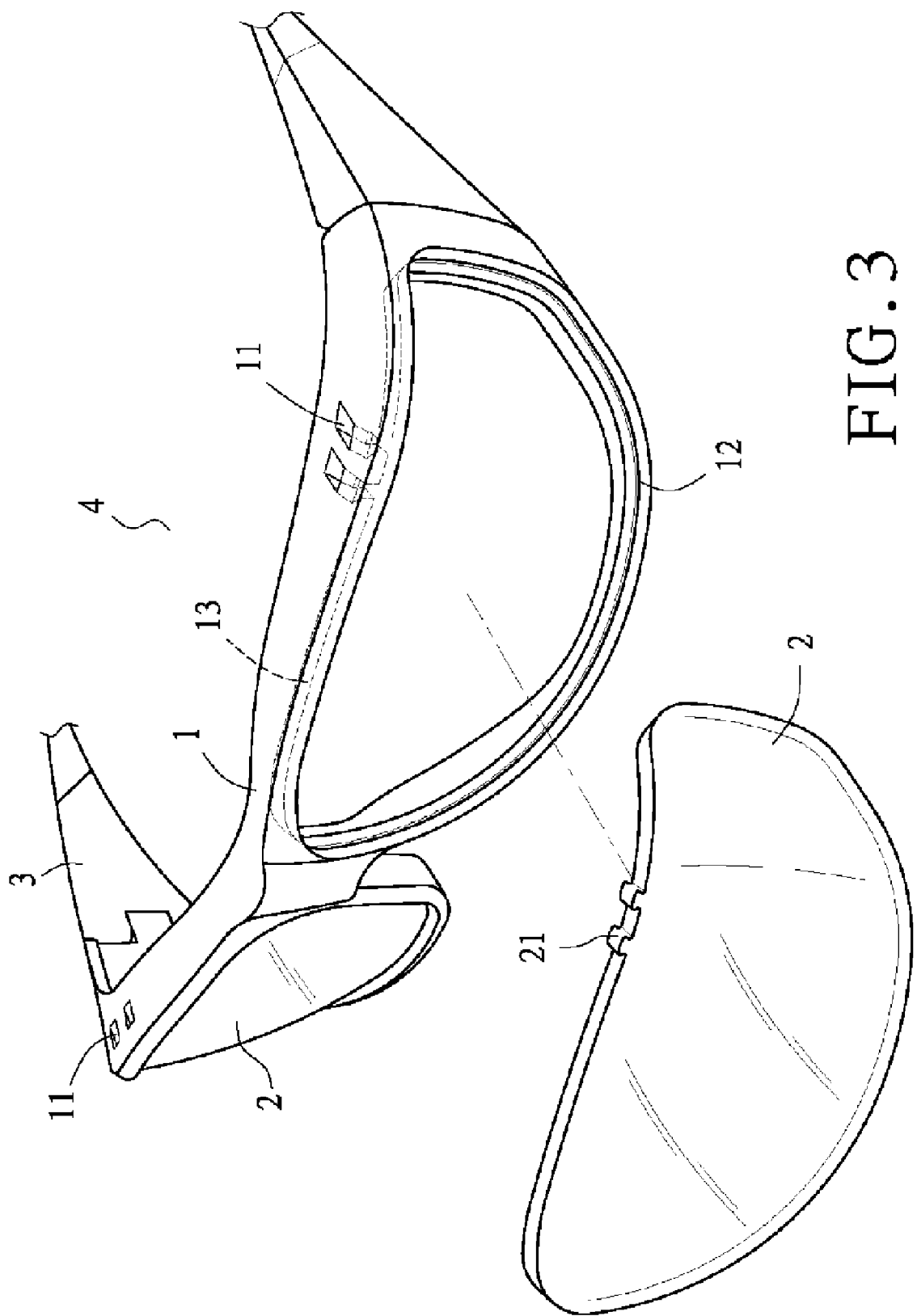
FIG. 3 is an exploded perspective view of a first preferred embodiment of eyeglasses according to the invention.

Referring to FIGS. 3 and 4, a pair of eyeglasses 4 in accordance with a first preferred embodiment of the invention is shown. The eyeglasses 4 comprise a frame 1, a pair of lenses 2 and a pair of temples 3 each pivotably connected to either end of the frame 1. The frame 1 includes left and right openings for receiving the lenses 2 and two sets of a plurality of adjacent through holes 11, each set formed on an outer top edge of each opening. Each of the openings includes a peripheral edge 12 having a peripheral groove 13 there along. The through holes 11 communicate with the grooves 13 and extend perpendicularly or at an incline. Each of the lenses 2 has a plurality of adjacent projections 21 formed on the position related to the through holes 11. The projections 21 are adapted to matingly, lockingly engage with the through holes 11.

In assembly, referring to FIG. 5, peripheral edges of the lenses 2 are inserted into the grooves 13 of the peripheral edges 12 and the projections 21 are inserted into the through holes 11 so as to fit the lenses 2 in the openings of the frame 1. Therefore, the lenses 2 will be securely fastened in the frame 1.

Referring to FIG. 6, a lens 2 and a frame 1 according to a second preferred embodiment of eyeglasses such as sunglasses or safety glasses of the invention are shown. The characteristics of the second preferred embodiment are that each of the lenses 2 further comprises a plurality of adjacent projections 21 formed on an outer bottom edge, and that the frame 1 further comprises two sets of a plurality of adjacent through holes 11, each set formed on an outer bottom edge related to the projections 21. The projections 21 are adapted to matingly, lockingly engage with the through holes 11 when the lenses 2 are fitted in the openings of the frame 1.

Figure 7:
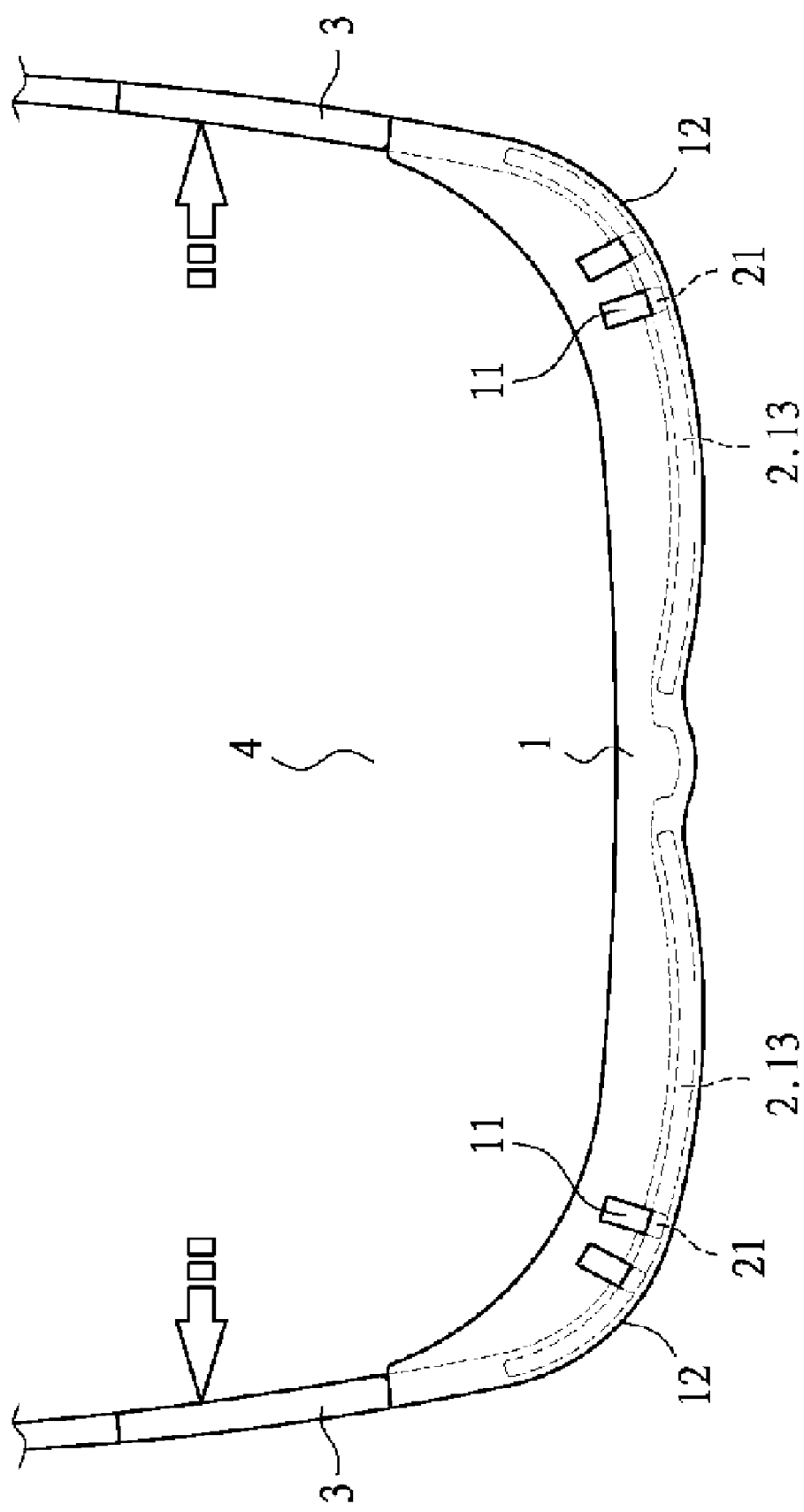
FIG. 7 is a top plan view of the eyeglasses in FIG. 3 showing a loosening of the lenses being made impossible by outward bending the temples.

Referring to FIG. 7, when a quality control test is performed, the eyeglasses 4 will be tested by repeatedly outward bending the temples 3. The frame 1 will therefore be pulled downwardly. Advantageously, the lenses 2 are still securely fitted in the frame 1, because the plurality of projections 21 of the lenses 2 are held in the corresponding through holes 11 of the frame 1. The eyeglasses 4 will therefore pass a quality control test and can efficiently protect a wearer from being hurt by loosening lenses.

In the case of the through holes 11 of the inclined type, the projection 21 is invisible from top when being held in the through hole 11, and air is able to pass through the through holes 11 so as to provide air circulation.

While the invention herein disclosed has been described by means of specific embodiments, numerous modifications and variations could be made thereto by those skilled in the art without departing from the scope and spirit of the invention set forth in the claims.

What is claimed is:

1. A pair of eyeglasses comprising a pair of lenses and a frame having a front face and a rear face and including a pair of openings extending between the front and rear faces and each having a peripheral groove for receiving the lenses, with the peripheral groove being spaced from the front and rear faces and extending continuously and completely around the opening;

wherein the frame includes through holes each provided on an outer top edge of each opening, said through holes communicate with the peripheral grooves of the openings at locations spaced from the front and rear faces, each of the lenses includes a projection formed on a position related to the through hole, and the projection is adapted to lockingly engage with the through hole with peripheral edges of the lenses being inserted into the grooves of the openings of the frame when the lenses are fitted in the openings of the frame.

2. The eyeglasses of claim 1, wherein the frame comprises two sets of at least one through hole, each set of the at least one through hole is provided on an outer top edge of each opening, each of the lenses comprises at least one projection formed on a position related to the through hole, and the at least one projection is adapted to lockingly engage with the at least one through hole when the lenses are fitted in the openings of the frame.

3. A pair of eyeglasses comprising a pair of lenses and a frame including a pair of openings having a peripheral groove for receiving the lenses;

wherein the frame includes through holes each provided on an outer top edge of each opening, said through holes communicate with the peripheral grooves of the openings, each of the lenses includes a projection formed on a position related to the through hole, and the projection is adapted to lockingly engage with the through hole with peripheral edges of the lenses being inserted into the grooves of the openings of the frame when the lenses are fitted in the openings of the frame, and wherein the through hole of the frame extends at an incline so that the projection is invisible when being held in the through hole.

4. A pair of eyeglasses comprising a pair of lenses and a frame including a pair of openings having a peripheral groove for receiving the lenses;

wherein the frame includes through holes each provided on an outer top edge of each opening, said through holes communicate with the peripheral grooves of the openings, each of the lenses includes a projection formed on a position related to the through hole, and the projection is adapted to lockingly engage with the through hole with peripheral edges of the lenses being inserted into the grooves of the openings of the frame when the lenses are fitted in the openings of the frame, and wherein each of the lenses further comprises at least one second projection formed on an outer bottom edge, the frame further comprises two sets of at least one second through hole, each set of the at least second through hole is formed on an outer bottom edge, and the at least one second projection is adapted to lockingly engage with the at least one second through hole when the lenses are fitted in the openings of the frame.

* * * * *